(12) United States Patent
Hu et al.

(10) Patent No.: US 12,512,532 B2
(45) Date of Patent: Dec. 30, 2025

(54) BATTERY PACK HAVING AN INTEGRATED COOLING SYSTEM

(71) Applicant: GM GLOBAL TECHNOLOGY OPERATIONS LLC, Detroit, MI (US)

(72) Inventors: Zhenwen Hu, Shanghai (CN); Xiaoling Chen, Sterling Heights, MI (US); Derek F. Lahr, Howell, MI (US); Hui-Ping Wang, Troy, MI (US); Chengwu Duan, Shanghai (CN); Jian Yao, Shanghai (CN); Lu Huang, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 335 days.

(21) Appl. No.: 18/500,467

(22) Filed: Nov. 2, 2023

(65) Prior Publication Data
US 2025/0087785 A1    Mar. 13, 2025

(30) Foreign Application Priority Data
Sep. 8, 2023 (CN) .......................... 202311161349.9

(51) Int. Cl.
*H01M 10/6556* (2014.01)
*B60L 50/64* (2019.01)
*H01M 10/613* (2014.01)
*H01M 10/625* (2014.01)
*H01M 10/6567* (2014.01)

(52) U.S. Cl.
CPC ......... *H01M 10/6556* (2015.04); *B60L 50/64* (2019.02); *H01M 10/613* (2015.04); *H01M 10/625* (2015.04); *H01M 10/6567* (2015.04); *H01M 2220/20* (2013.01)

(58) Field of Classification Search
CPC .......................... H01M 10/6556; B60L 50/64
See application file for complete search history.

(56) References Cited

U.S. PATENT DOCUMENTS

| | | | |
|---|---|---|---|
| 6,569,561 B1 * | 5/2003 | Kimura | H01M 10/647 429/153 |
| 10,749,225 B2 * | 8/2020 | Robert | H01M 50/291 |

(Continued)

FOREIGN PATENT DOCUMENTS

| | | |
|---|---|---|
| CN | 103219558 A | 7/2013 |
| DE | 112012002517 T5 | 2/2014 |
| DE | 112012002518 T5 | 3/2014 |

*Primary Examiner* — Brian L Swenson
(74) *Attorney, Agent, or Firm* — Quinn IP Law

(57) ABSTRACT

A battery pack includes a first header having a first conduit and a second header having a second conduit. The battery pack also includes an energy storage system having energy storage cells arranged between the first header and the second header. A coolant plate assembly is arranged between the first header and the second header and abuts the plurality of energy storage cells. The coolant plate assembly includes a coolant channel having a first end fluidically connected to the first conduit, a second end fluidically connected to the second conduit, and an intermediate portion defining a flow path. The coolant plate assembly also includes a first planar section having a first surface facing the energy storage cells and a second surface having protrusions extending into the coolant channel.

20 Claims, 7 Drawing Sheets

(56) References Cited

U.S. PATENT DOCUMENTS

| | | | |
|---|---|---|---|
| 2013/0189558 A1* | 7/2013 | Haussmann | H01M 10/658 |
| | | | 429/120 |
| 2019/0115637 A1* | 4/2019 | Kim | H01M 10/6557 |
| 2020/0006822 A1* | 1/2020 | Shisler | F28D 9/0056 |
| 2020/0248973 A1* | 8/2020 | Subramanyam | H01M 10/6556 |
| 2021/0135305 A1* | 5/2021 | David | H01M 10/625 |
| 2022/0059894 A1* | 2/2022 | Stephens | B60K 1/04 |
| 2023/0327257 A1* | 10/2023 | Ishitobi | B60L 50/66 |
| | | | 429/120 |
| 2025/0145026 A1* | 5/2025 | Hooton | H01M 10/625 |
| 2025/0149676 A1* | 5/2025 | Balding | H01M 50/211 |
| 2025/0183450 A1* | 6/2025 | Grabow | H01M 50/242 |

\* cited by examiner

BATTERY PACK HAVING AN INTEGRATED COOLING SYSTEM

CROSS-REFERENCE TO RELATED APPLICATIONS

This application claims priority to and the benefit of Chinese Patent Application No. 202311161349.9, which was filed on Sep. 8, 2023, and which is hereby incorporated by reference in its entirety.

INTRODUCTION

The subject disclosure relates to the art of rechargeable energy storage systems and, more particularly, to a rechargeable energy storage system for a vehicle including a battery pack having an integrated cooling system.

Rechargeable energy storage systems (RESS) typically include one or more battery packs having rechargeable energy storage cells. The battery pack is connectable to an external charging system that replenishes electrical energy lost to a load. The charging system may be part of a vehicle, or may be part of an external charging station. When providing power to a vehicle, the battery pack discharges stored electrical energy. Replenishing and discharging the stored electrical energy creates heat which, if not removed, can detract from battery pack efficiency.

There are a wide array of systems employed to cool batteries. For example, many batteries will include a forced air convection system that delivers a flow of air over battery components. Other systems may employ heat sinks that absorb heat. Absorbed heat may be given up to forced air currents. Still other systems may employ cold plates. A cold plate is typically formed from aluminum and may include internal passages that circulate a fluid. The fluid absorbs heat that may be given off from a battery pack in thermal contact with the cold plate.

SUMMARY

Disclosed herein is a battery pack. The battery pack includes a first header having a first conduit and a second header having a second conduit. The battery pack also includes an energy storage system having energy storage cells arranged between the first header and the second header. A coolant plate assembly is arranged between the first header and the second header and abuts the plurality of energy storage cells. The coolant plate assembly includes a coolant channel having a first end fluidically connected to the first conduit, a second end fluidically connected to the second conduit, and an intermediate portion defining a flow path. The coolant plate assembly also includes a first planar section having a first surface facing the energy storage cells and a second surface having protrusions extending into the coolant channel.

Another aspect of the disclosure may be where the first plurality of protrusions includes varying heights relative to the second surface of the first planar section.

Another aspect of the disclosure may be where the first plurality of protrusions is arranged in columns with the first plurality of protrusions in adjacent columns being offset relative to each other in a direction perpendicular to a direction of coolant fluid flow through the coolant channel.

Another aspect of the disclosure included another group of energy storage cells arranged between the first header and the second header and spaced from the energy storage cells. Another coolant plate assembly is arranged between the first header and the second header and abuts each of the another group of energy storage cells. The another coolant plate includes another coolant channel having a first end portion fluidically connected to the first conduit, a second end portion fluidically connected to the second conduit, and an intermediate section defining another flow path. The another coolant plate assembly includes a second planar section having a first surface facing the another group of energy storage cells and a second surface having second protrusions extending into the another coolant channel.

Another aspect of the disclosure may be where the second plurality of protrusions includes varying heights relative to the second surface.

Another aspect of the disclosure may be where the second plurality of protrusions are arranged in columns with the second plurality of protrusions in adjacent columns being offset relative to each other in a direction perpendicular to coolant flow through the another coolant channel.

Another aspect of the disclosure may be where the first surface on the first planar section of the coolant plate assembly is coated with a thermal interface material that directly engages the plurality of energy storage cells and the first surface on the second planar section of the another coolant plate is coated with a thermal interface material that directly engages the another plurality of energy storage cells.

Another aspect of the disclosure may be where the coolant plate assembly includes a first curvilinear section having a first inner surface that faces the coolant channel and a first outer surface and the another coolant plate assembly includes a second curvilinear section having a second inner surface that faces the another coolant channel and a second outer surface.

Another aspect of the disclosure may be where the first outer surface of the coolant plate assembly abuts the second outer surface of the another coolant plate assembly at a coolant plate interface.

Another aspect of the disclosure may include a first air gap arranged at a first side of the coolant plate interface and a second air gap arranged at a second side of the coolant plate interface.

Another aspect of the disclosure may be where the first plurality of protrusions each include a perimeter wall that extends from the first surface of the first planar section to a first outer facing surface and the second plurality of protrusions each include a perimeter wall that extends from the second surface of the second planar section to an outer facing surface.

Another aspect of the disclosure may be where the first conduit includes a first coolant inlet conduit and a first coolant outlet conduit, and the second conduit includes a second coolant inlet conduit and a second coolant outlet conduit, the first coolant inlet conduit being fluidically connected to the second coolant outlet conduit and the second coolant inlet conduit being fluidically connected to the first coolant outlet conduit.

Disclosed herein is a vehicle. The vehicle includes a body defining a passenger compartment, an electric motor supported in the body, and a battery pack connected to the electric motor. The battery pack includes a first header having a first conduit and a second header having a second conduit. The battery pack also includes an energy storage system having energy storage cells arranged between the first header and the second header. A coolant plate assembly is arranged between the first header and the second header and abuts the plurality of energy storage cells. The coolant plate assembly includes a coolant channel having a first end fluidically connected to the first conduit, a second end fluidically connected to the second conduit, and an intermediate portion defining a flow path. The coolant plate assembly also includes a first planar section having a first surface facing the energy storage cells and a second surface having protrusions extending into the coolant channel.

Disclosed herein is a coolant system. The coolant system includes a coolant plate assembly arranged between a first header and a second header. The coolant plate assembly includes a coolant channel having a first end fluidically connected to a first conduit, a second end fluidically connected to a second conduit, and an intermediate portion defining a flow path. The coolant plate assembly also includes a first planar section having a first surface for facing at least one first energy storage cell and a second surface at least partially defining the coolant channel and having a first group of protrusions extending into the coolant channel. The coolant system also includes another coolant plate assembly arranged between the first header and the second header. The another coolant plate assembly includes another coolant channel having a first end portion fluidically connected to the first conduit, a second end portion fluidically connected to the second conduit, and an intermediate section defining another flow path. The another coolant plate also includes a second planar section having a first surface for facing the at least one second energy storage cell and a second surface having a second group of protrusions extending into the another coolant channel.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
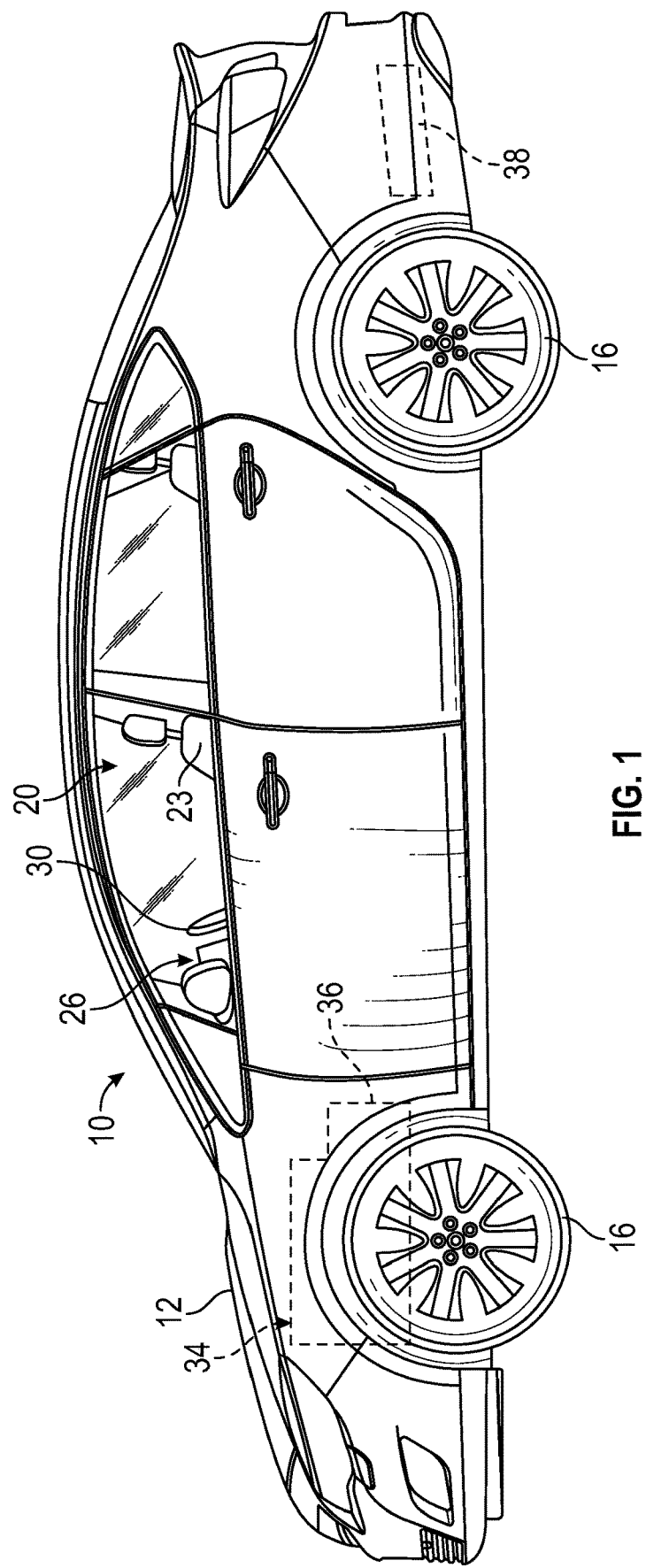
FIG. 1 is a left side view of a vehicle including a rechargeable energy storage system having a battery pack including an integrated cooling system, in accordance with a non-limiting example.

The following description is merely exemplary in nature and is not intended to limit the present disclosure, its application or uses. It should be understood that throughout the drawings, corresponding reference numerals indicate like or corresponding parts and features.

A vehicle, in accordance with a non-limiting example, is indicated generally at 10 in FIG. 1. Vehicle 10 includes a body 12 supported on a plurality of wheels 16. One or more of the plurality of wheels 16 are steerable. Body 12 defines, in part, a passenger compartment 20 having seats 23 positioned behind a dashboard 26. A steering control 30 is arranged between seats 23 and dashboard 26. Steering control 30 is operated to control orientation of the steerable wheel(s).

Figure 2:
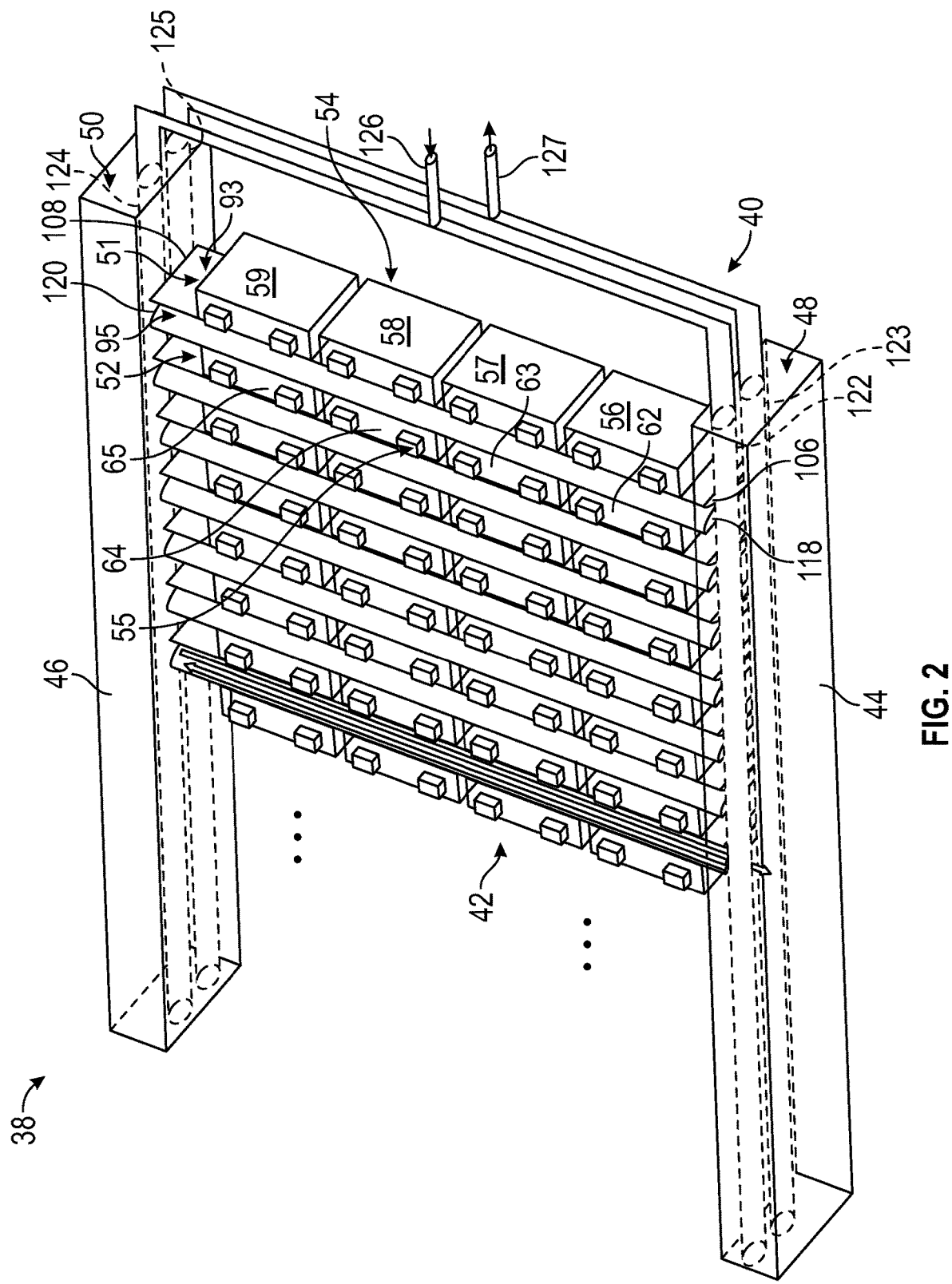
FIG. 2 is a schematic view of a portion of a battery pack including a first plurality of cells and a second plurality of cells separated by a first coolant plate and a second coolant plate, in accordance with a non-limiting example.
Figure 3:
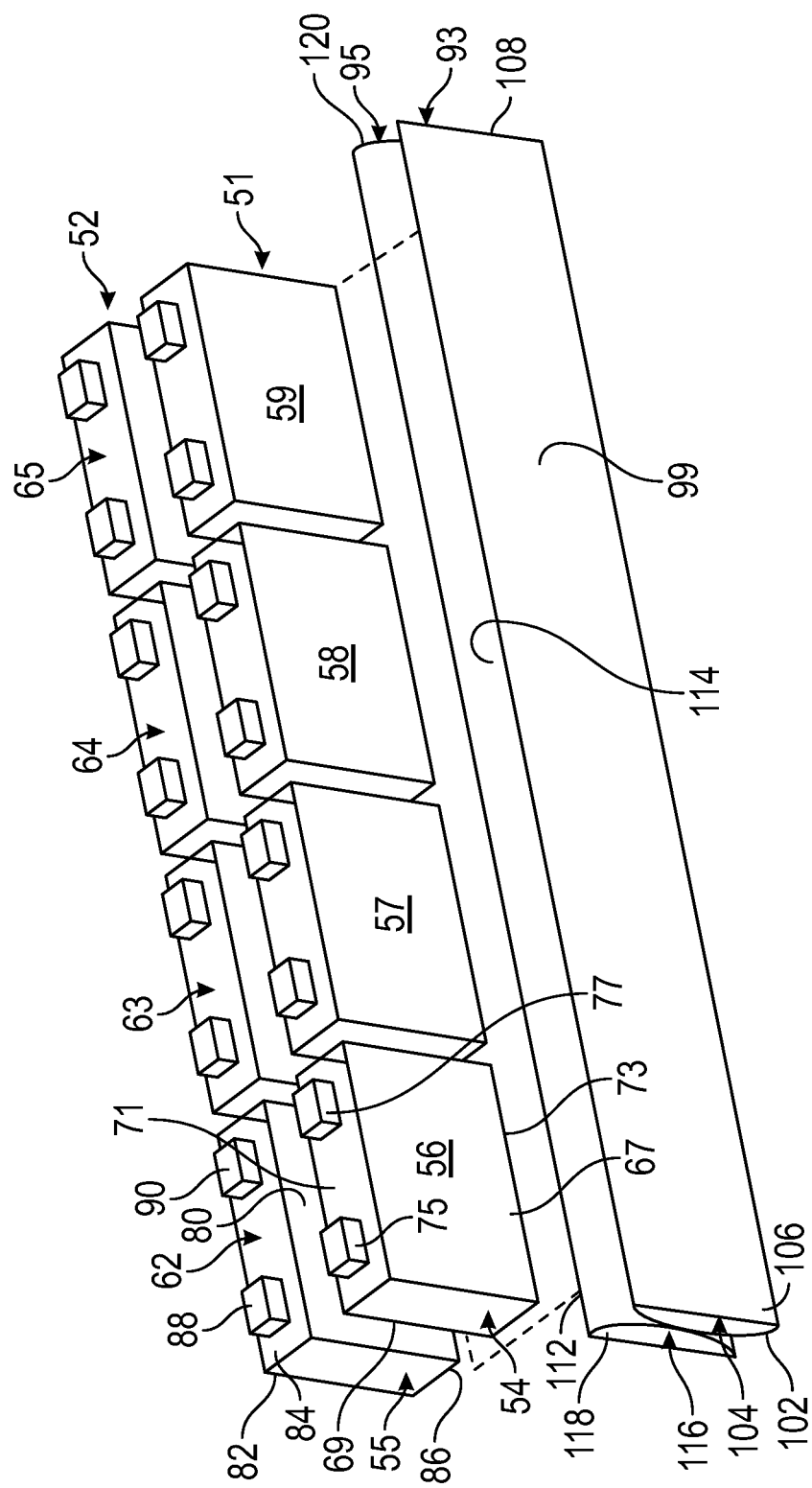
FIG. 3 is a disassembled view of the first plurality of cells and second plurality of cells and first and second coolant plates, in accordance with a non-limiting example.

Vehicle 10 includes an electric motor 34 connected to a transmission 36 that provides power to one or more of the plurality of wheels 16. A rechargeable energy storage system (RESS) 38 is arranged in body 12 and provides power to electric motor 34. At this point, it should be understood that the location of electric motor 34, transmission 36, and RESS 38 in body 12 may vary. Referring to FIGS. 2 and 3, RESS 38 includes a battery pack 40 including an energy storage system, indicated generally at 42.

The energy storage system 42 is arranged between a first header 44 and a second header 46. The first header 44 includes a first interior 48 and second header 46 includes a second interior 50. In the non-limiting example shown, the energy storage system 42 includes a first energy storage cell row 51 and a second energy storage cell row 52 arranged alongside and parallel to the first energy storage cell row 51. While two energy storage cells rows 51, 52 are discussed, it should be understood that the number and arrangement of energy storage cell rows, arranged between the first header 44 and the second header 46 may vary.

The first energy storage cell row 51 includes a first plurality of energy storage cells 54 and the second energy storage cell row 52 includes a second plurality of energy storage cells 55. The first plurality of energy storage cells 54 includes a first energy storage cell 56, a second energy storage cell 57, a third energy storage cell 58, and a fourth energy storage cell 59. The second plurality of energy storage cells 55 includes a fifth energy storage cell 62, a sixth energy storage cell 63, a seventh energy storage cell 64, and an eighth energy storage cell 65. The number of cells in each energy storage cell row may vary.

Figure 4:
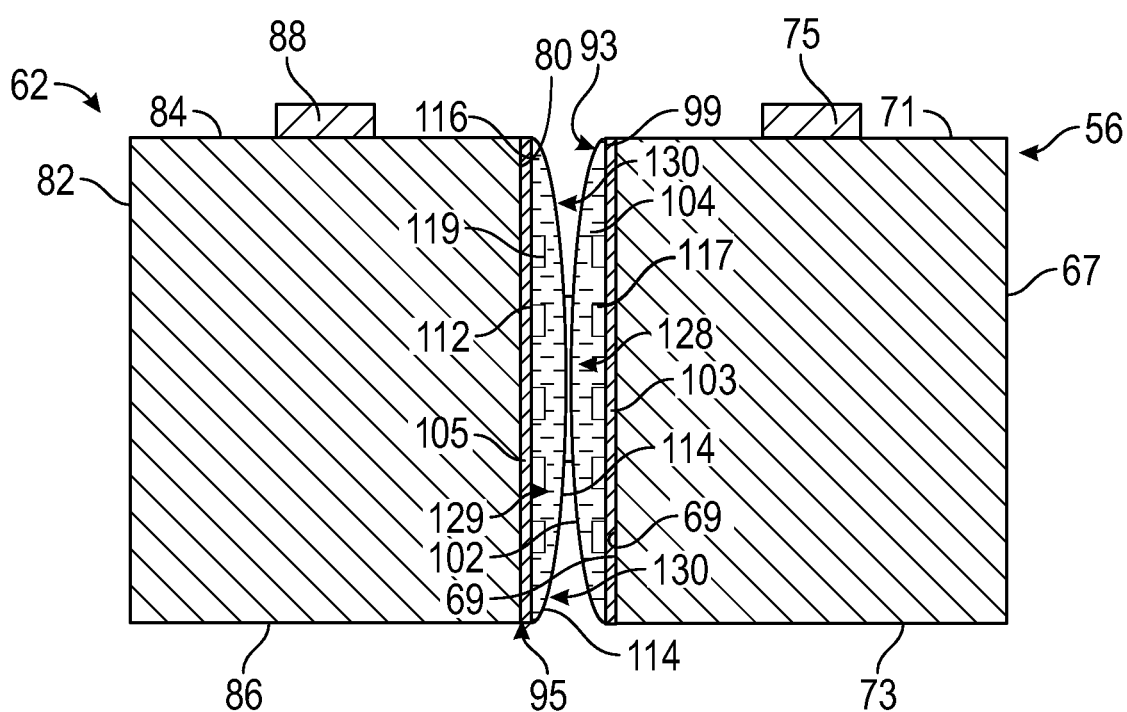
FIG. 4 is an end elevational view of one of the first plurality of cells and one of the second plurality of cells and first and second coolant plates of FIG. 3 including an amount of coolant fluid, in accordance with a non-limiting example.

Reference will now follow to FIGS. 3 and 4 with continued reference to FIG. 2 in describing the first energy storage cell 56 and the fifth energy storage cell 62 with an understanding that the remaining energy storage cells 57-59 and 63-65 include similar structure. In a non-limiting example, the first energy storage cell 56 includes a first surface 67, a second surface 69 that is generally parallel to the first surface 67, a third surface 71 that extends between the first surface 67 and the second surface 69, and a fourth surface 73 that is generally parallel to the third surface 71. The first energy storage cell 56 includes additional surfaces (not separately labeled). Electrical connection elements, shown in the form of an anode 75 and a cathode 77, are arranged on the third surface 71.

The fifth energy storage cell 62 includes a first surface portion 80, a second surface portion 82 that is generally parallel to the first surface portion 80, a third surface portion 84 that extends between the first surface portion 80 and the second surface portion 82, and a fourth surface portion 86 that is generally parallel to the third surface portion 84. The fifth energy storage cell 62 includes additional surfaces (not separately labeled). Electrical connection elements, shown in the form of an anode member 88 and a cathode member 90, are arranged on the third surface portion 84.

In a non-limiting example, battery pack 40 includes a first coolant plate assembly 93 arranged on the second surface 69 of each of the first plurality of energy storage cells 54 and a second coolant plate assembly 95 arranged on the first surface portion 80 of each of the second plurality of energy storage cells 55. In a non-limiting example, the first coolant plate assembly 93 and the second coolant plate assembly 95 abut one another and are disposed between adjacent rows of energy storage cells as shown in FIG. 2.

Figure 5:
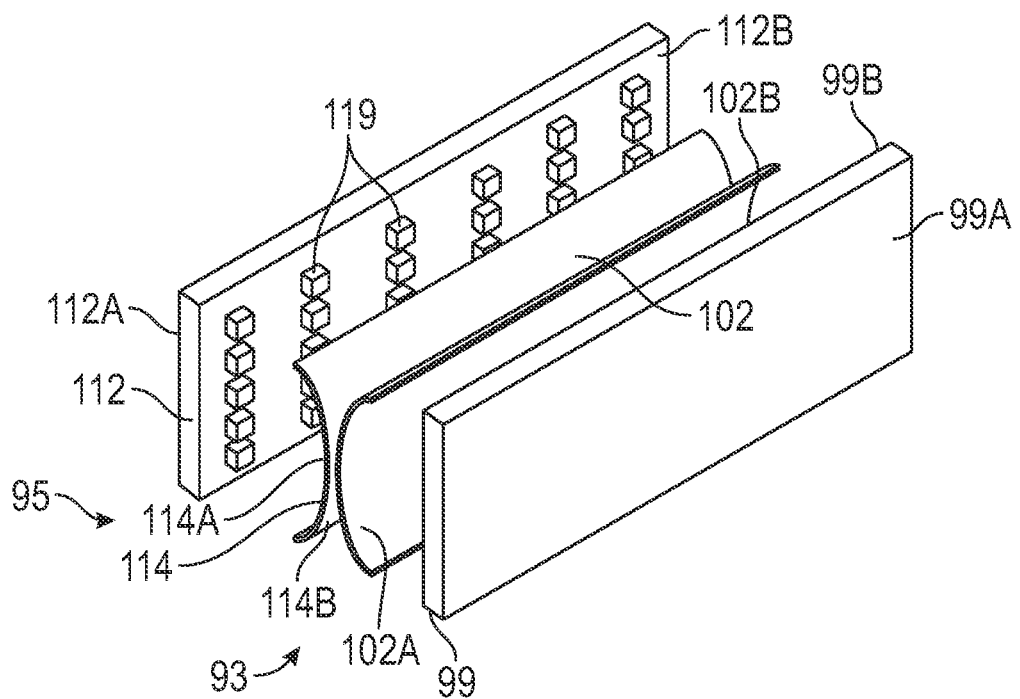
FIG. 5 is a perspective view of the first coolant plate in an expanded view, in accordance with a non-limiting example.

In a non-limiting example shown in FIGS. 3-5, the first coolant plate assembly 93 includes a first planar section 99 and a first curvilinear section 102 that together at least partially define a first coolant channel 104. The first planar section 99 includes a first surface 99A that faces and is secured relative to each of the first plurality of energy storage cells 54 and a second surface 99B opposite the first surface 99A that at least partially defines the first coolant channel 104. The first surface 99A can be directly attached to the first plurality of energy storage cells 54 through a first adhesive member 103 (FIG. 4). The first curvilinear section 102 includes an inner surface 102A that faces the first coolant channel 104 and an outer surface 102B that faces away from the first coolant channel 104. The first coolant channel 104 extends between a first end 106 arranged at the first header 44 and a second end 108 arranged at the second header 46.

In a non-limiting example, the second coolant plate assembly 95 includes a second planar section 112 and a second curvilinear section 114 that together at least partially define a second coolant channel 116. The second planar section 112 includes a first surface 112A that faces and is secured relative to each of the second plurality of energy storage cells 55 and a second surface 112B opposite the first surface 112A that at least partially defines the second coolant channel 116. The first surface 112A can be directly attached to the second plurality of energy storage cells 55 through a second adhesive member 115. The second curvilinear section 114 includes an inner surface 114A that faces the second coolant channel 116 and an outer surface 114B that faces away from the second coolant channel 116. The outer surface 114B on the second coolant plate assembly 95 abuts the outer surface 102B on the first coolant plate assembly 93 at an interface. The second coolant channel 116 extends between a first end section 118 arranged at first header 44 and a second end section 120 arranged at second header 46.

In a non-limiting example illustrated in FIG. 2, a first coolant inlet conduit 122 extends through the first header 44 and is fluidically connected to the first coolant channel 104 at the first end 106. A first coolant outlet conduit 123 extends through the first header 44 and is fluidically connected to the second coolant channel 116 at the first end section 118. At this point, it should be appreciated that the first coolant inlet conduit 122 and the first coolant outlet conduit 123 are fluidically connected to coolant channels (not separately labeled) passing through remaining ones of the first and second coolant plates.

As further shown in FIG. 2, a second coolant inlet conduit 124 extends through the second header 46 and is fluidically connected to the second coolant channel 116 at the second end section 120. A second coolant outlet conduit 125 extends through the second header 46 and is fluidically connected to the second end 108 of the first coolant channel 104. The particular arrangement of the coolant inlet conduits 122 and 124 and the coolant outlet conduits 123 and 125 creates a crossflow between adjacent the energy storage cell rows 51 and 52. The crossflow enhances heat exchange efficiency between coolant flowing through the first coolant channel 104 and the second coolant channel 116 and the first and second pluralities of energy storage cells 54 and 55.

At this point, it should be understood that coolant fluid flowing through the first coolant plate assembly 93 and the second coolant plate assembly 95 may be driven by a pump (not shown) and passed through a heat exchanger (also not shown). The first and second coolant inlet conduits 122 and 124 are fluidically connected through a cooling supply line 126 which, in turn, is fluidically connected to the pump (not shown) and the first coolant outlet conduit 123 and the second coolant outlet conduit 125 may direct heat entrained fluid through a coolant exit line 127 and on into the heat exchanger (also not shown).

Referring to FIG. 4, a first coolant fluid 128 passes through the first coolant channel 104 and a second coolant fluid 129 flows through the second coolant channel 116. The particular type of coolant fluid may vary and could include liquid coolants such as water solutions, glycol solutions, and the like as well as gaseous coolants. In addition to coolant fluid, air may pass through gaps 130 that are formed when outer surfaces 102B, 114B on the first and second coolant plate assemblies 93, 95, respectively. The air may be forced convection air streams that are guided over battery pack 40.

Furthermore, the gaps 130 between the first coolant plate assembly 93 and second coolant plate assembly 95 can accommodate an amount of compression developed through operation of battery pack 40 by allowing an amount of deformation of, for example, the first curvilinear section 102 and/or the second curvilinear section 114. The amount of deformation of the first curvilinear section 102 and/or second curvilinear section 114 may be between about 0.1-mm and about 2-mm.

As shown in FIGS. 4-7, the first coolant plate assembly 93 includes a first plurality of protrusions 117 that extend in a direction away from the first energy storage cells 54 and into the first coolant channel 104. Similarly, the second coolant plate assembly 95 includes a second plurality of protrusions 119 that extend in a direction away from the second plurality of energy storage cells 55 and into the second coolant channel 116. In the illustrated example, the first and second plurality of protrusions 117, 119 are arranged in columns that extend perpendicular to a direction of coolant fluid flow through the first and second coolant channels 104, 116, respectively.

Figure 6:
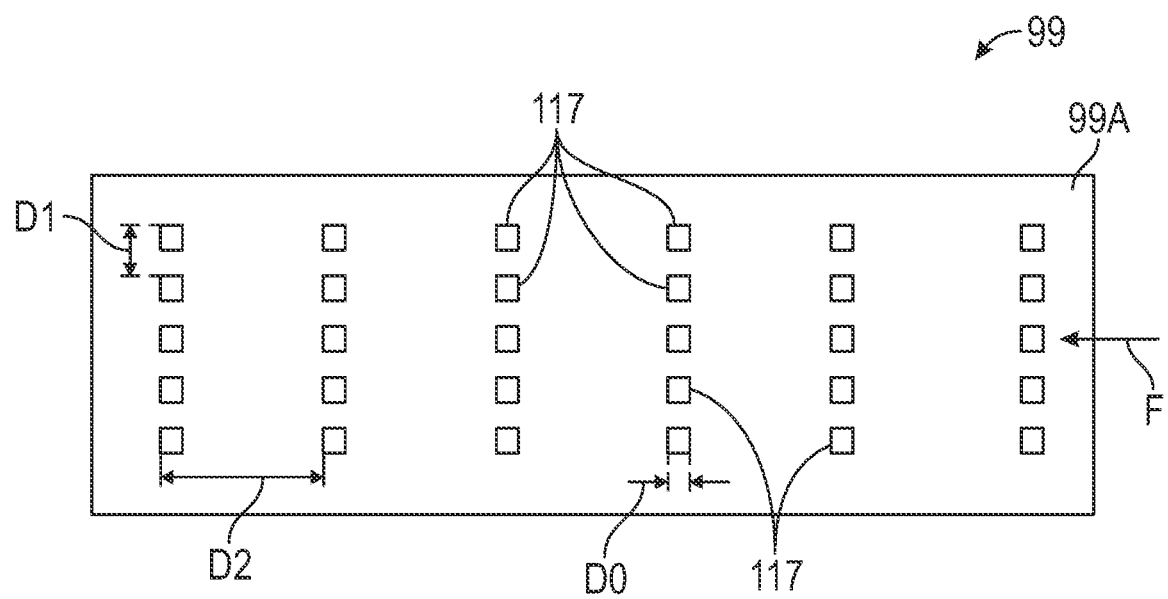
FIG. 6 is a side elevation view of a first planar section having a plurality of aligned protrusions, in accordance with a non-limiting example.
Figure 7:
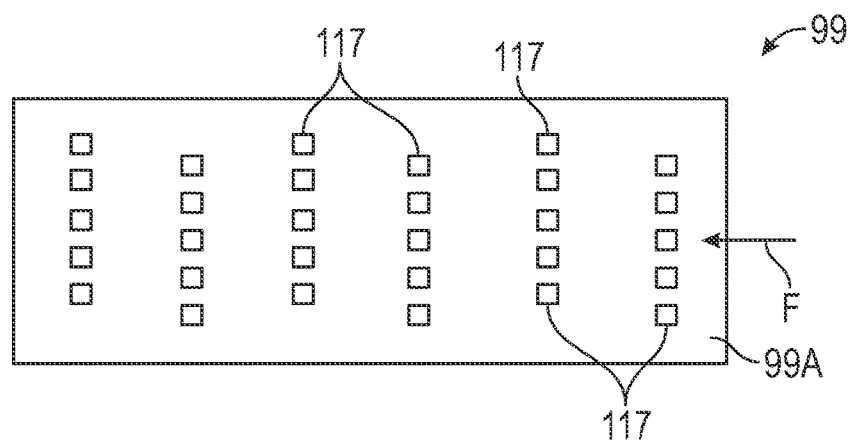
FIG. 7 is a side elevation view of a first planar section having a plurality of staggered protrusions, in accordance with a non-limiting example.

As shown in FIGS. 6 and 7, the protrusions 117 on the first planar section 99 can have different arrangements depending on a level local turbulence desired to create in the coolant fluid flow. While FIGS. 6 and 7 illustrate the first planar section 99, the arrangement of protrusions 117 illustrated would also apply to protrusions 119 on the second planar section 112 of the second coolant plate assembly 95. In one example, the protrusions 117 include a vertical distance D1 between two adjacent protrusions 117 that is less than five times of an equivalent diameter D0 of the protrusions 117. In this example, vertical is in a direction perpendicular to the coolant fluid flow F through the first channel 104. Also, a horizontal distance D2 between adjacent protrusions 117 should be less than ten times of the equivalent diameter D0 of the protrusion 117 to increase local turbulence in the coolant fluid flow F to improve heat transfer. Furthermore, the protrusions 117 can be arranged in a grid of aligned rows and columns as shown in FIG. 7 or the first plurality of protrusions 117 can be arranged in columns with adjacent columns being offset relative to each other in a direction perpendicular to coolant fluid flow F through the first coolant channel 104.

Figures 8, 9:
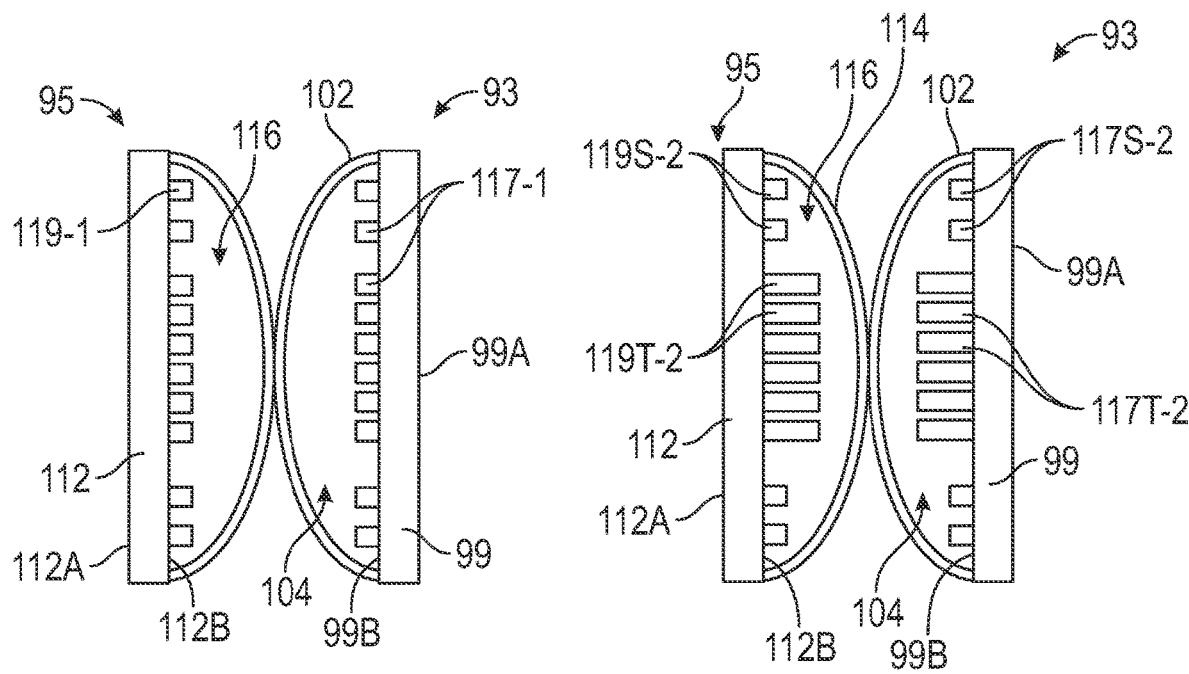
FIG. 8 is a schematic view of an end elevation of another first coolant plate assembly and a second coolant plate assembly with same height protrusions, in accordance with a non-limiting example
FIG. 9 is a schematic view of an end elevation of yet another first coolant plate assembly and a second coolant plate assembly with varied height protrusions, in accordance with a non-limiting example.

FIG. 8 illustrates the first and second cooling plate assemblies 93, 95 with another example set of the first and second plurality of protrusions 117-1, 119-1, respectively. The first and second plurality of protrusions 117-1 and 119-1 are similar to the first and second plurality of protrusions 117 and 119 disclosed above except where shown in the drawings are described below. In the illustrated example, first and second plurality of protrusion 117-1, 119-1 include a varying spacing between adjacent protrusions 117-1, 119-1 in a direction perpendicular to a direction of flow of coolant flow through first and second coolant channels 104, 116 in the first and second cooling plate assemblies 93, 95, respectively. In particular, a spacing between the first and second plurality of protrusions 117-1, 119-1 in a middle region of a column of the first and second coolant channels 104, 116 is less than a spaced between adjacent first and second protrusion 117-1, 119-1 along edges of the first and second coolant channels 104, 116, respectively. One feature of the variable spacing is increased heat transfer by varying turbulence induced in the coolant fluid flow in the first and second coolant channels 104, 116.

FIG. 9 illustrates the first and second cooling plate assemblies 93, 95 with yet another example set of the first and second plurality of protrusions 117S-2, 117T-2, 119S-2, 119T-2, respectively. The first and second plurality of protrusions 117S-2, 117T-2, 119S-2, 119T-2 are similar to the first and second plurality of protrusions 117 and 119 disclosed above except where shown in the drawings are described below. In the illustrated example, first and second plurality of protrusion 117S-2, 117T-2, 119S-2, 119T-2 include a varying spacing between adjacent protrusions 117S-2, 117T-2, 119S-2, 119T-2 in a direction perpendicular to a direction of coolant fluid flow through first and second coolant channels 104, 116 in the first and second cooling plate assemblies 93, 95, respectively. Furthermore, the first and second plurality of protrusions 117S-2, 117T-2, 119S-2, 119T-2 project varying distances from the second surfaces 99B and 112B, respectively, such that a height of the first and second plurality of protrusions 117S-2, 117T-2, 119S-2, 119T-2 varies. In particular, the height of the first and second plurality of protrusions 117-2, 119-2 in a middle region of the first and second coolant channels 104, 116 is greater than the height the first and second protrusion 117S-2, 117T-2, 119S-2, 119T-2 along edges of the first and second coolant channels 104, 116, respectively.

The protrusions 117-1, 117S-2, 117T-2 119-1, 119S-2, 119T-2 can provide a mechanical stop to limit compression of the first and second curvilinear sections 102, 114 to ensure space for maintaining a desired coolant fluid flow rate. The arrangement of protrusions 117, 119 can be configured to accommodate uneven compression of the interlayer. For example, the protrusions 117T-2, 119T-2 shown in FIG. 9 extend a greater distance from the second surfaces 99B, 112B in a central region than compared to along top and bottom edges of the second surfaces 99B, 112B. This configuration of the first and second plurality of protrusions 117S-2, 117T-2, 119S-2, 119T-2 in FIG. 9 allows for less deflection of the first and second curvilinear sections 102, 114 prior to engaging protrusions on adjacent coolant plate assemblies 93, 95.

Figure 10:
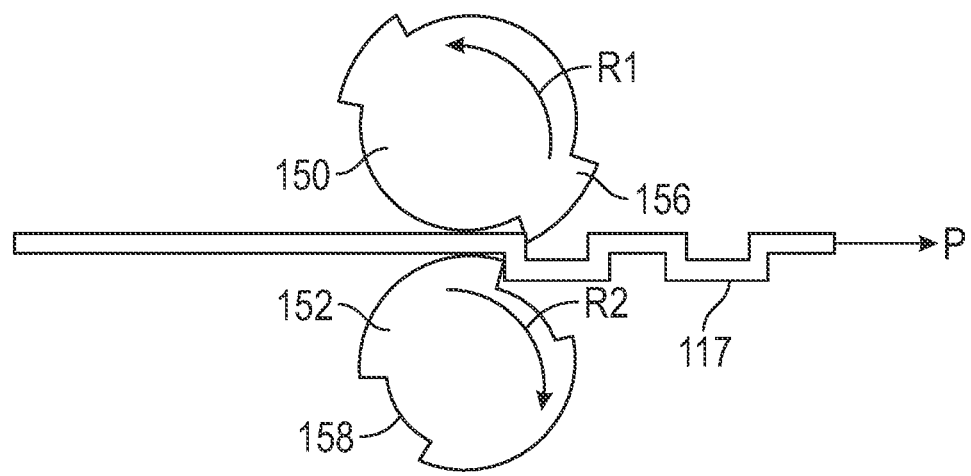
FIG. 10 is a schematic view of forming a first planar section of either the first or second coolant plate assemblies, in accordance with a non-limiting example.

As shown in FIG. 10, the first planar sections 99 of the first coolant plate assembly 93 can be formed through the use of a male roller 150 configured to roll in a direction R1 and a corresponding female roller 152 configured to roll in a direction R2 to form the protrusions 117. However, the rollers 150, 152 can be used to form the first planar section 112 for the second coolant plate assembly 95 in the same manner as described for the first coolant plate assembly 93. In particular, material is fed into the rollers 150, 152 in the direction P such that male portions 156 of the roller 150 can extrude the material into corresponding female portions 158 on the roller 152 to form the protrusions 117.

Figure 11:
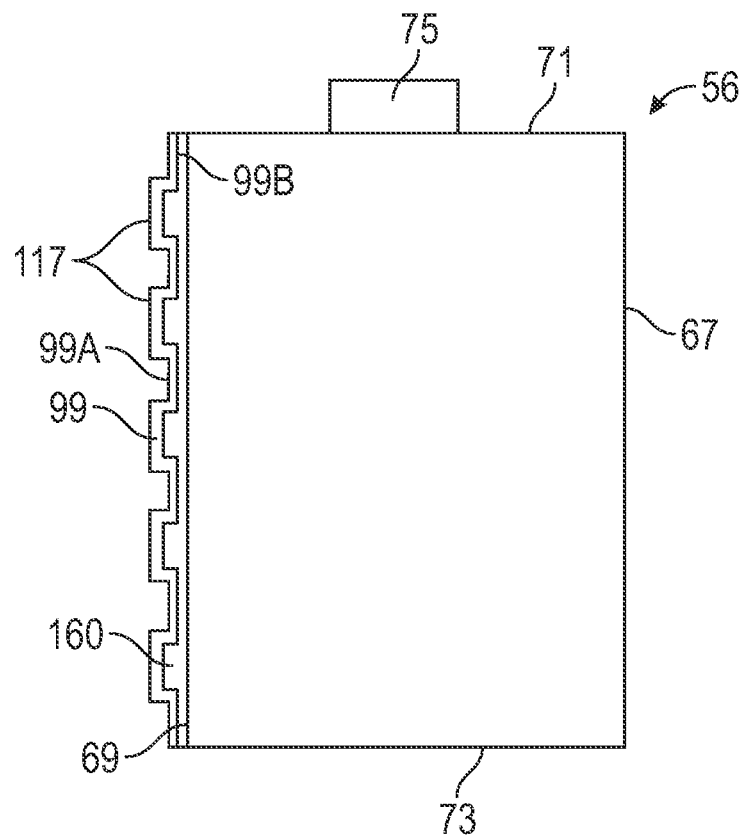
FIG. 11 is a schematic view of attaching the first planar section formed in FIG. 10 to an energy storage cell, in accordance with a non-limiting example

As shown in FIG. 11, the first planar section 99 can include a thermal interface material 160, such as [Inventors: Please provide example materials] that is placed on the first surface 99A. The thermal interface material increases the heat transfer between the first coolant plate assembly 93 and the first plurality of energy storage cells 54 by filling the voids in the first surface 99A to improve heat transfer. The first planar surface 99A of the second coolant plate assembly 95 can be attached to the second plurality of energy storage cells 55 in a similar manner. Also, the thermal interface material can be used in place of the adhesives 103, 105 (FIG. 4), or in addition to the adhesives 103, 105 for attaching the first and second coolant plate assemblies 93, 95 to the first and second plurality of energy storage cells 54, 55, respectively.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

While various embodiments have been described, the description is intended to be exemplary rather than limiting. It will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims.

What is claimed is:

1. A battery pack comprising:
   a first header including a first conduit;
   a second header including a second conduit;
   an energy storage system including a plurality of energy storage cells arranged between the first header and the second header; and
   a coolant plate assembly arranged between the first header and the second header and abutting the plurality of energy storage cells, the coolant plate assembly including a coolant channel having a first end fluidically connected to the first conduit, a second end fluidically connected to the second conduit, and an intermediate portion defining a flow path, wherein the coolant plate assembly includes a first planar section having a first surface facing the plurality of energy storage cells and a second surface having a first plurality of protrusions extending into the coolant channel.

2. The battery pack of claim 1, wherein the first plurality of protrusions includes varying heights relative to the second surface of the first planar section.

3. The battery pack of claim 1, wherein the first plurality of protrusions is arranged in columns with the first plurality of protrusions in adjacent columns being offset relative to each other in a direction perpendicular to a direction of coolant fluid flow through the coolant channel.

4. The battery pack of claim 1, including:
another plurality of energy storage cells arranged between the first header and the second header and spaced from the plurality of energy storage cells; and
another coolant plate assembly arranged between the first header and the second header and abutting each of the another plurality of energy storage cells, the another coolant plate assembly including another coolant channel having a first end portion fluidically connected to the first conduit, a second end portion fluidically connected to the second conduit, and an intermediate section defining another flow path, wherein the another coolant plate assembly includes a second planar section having a first surface facing the another plurality of energy storage cells and a second surface having a second plurality of protrusions extending into the another coolant channel.

5. The battery pack of claim 4, wherein the second plurality of protrusions includes varying heights relative to the second surface.

6. The battery pack of claim 4, wherein the second plurality of protrusions are arranged in columns with the second plurality of protrusions in adjacent columns being offset relative to each other in a direction perpendicular to coolant flow through the another coolant channel.

7. The battery pack of claim 4, wherein the first surface on the first planar section of the coolant plate assembly is coated with a thermal interface material that directly engages the plurality of energy storage cells and the first surface on the second planar section of the another coolant plate is coated with another thermal interface material that directly engages the another plurality of energy storage cells.

8. The battery pack of claim 4, wherein the coolant plate assembly includes a first curvilinear section having a first inner surface that faces the coolant channel and a first outer surface and the another coolant plate assembly includes a second curvilinear section having a second inner surface that faces the another coolant channel and a second outer surface.

9. The battery pack of claim 8, wherein the first outer surface of the coolant plate assembly abuts the second outer surface of the another coolant plate assembly at a coolant plate interface.

10. The battery pack of claim 9, including a first air gap arranged at a first side of the coolant plate interface and a second air gap arranged at a second side of the coolant plate interface.

11. The battery pack of claim 4, wherein the first plurality of protrusions each include a perimeter wall that extends from the first surface of the first planar section to a first outer facing surface and the second plurality of protrusions each include another perimeter wall that extends from the second surface of the second planar section to an outer facing surface.

12. The battery pack of claim 1, wherein the first conduit includes a first coolant inlet conduit and a first coolant outlet conduit, and the second conduit includes a second coolant inlet conduit and a second coolant outlet conduit, the first coolant inlet conduit being fluidically connected to the second coolant outlet conduit and the second coolant inlet conduit being fluidically connected to the first coolant outlet conduit.

13. A vehicle comprising:
a body defining a passenger compartment;
an electric motor supported in the body; and
a battery pack operatively connected to the electric motor, the battery pack comprising:
a first header including a first conduit;
a second header including a second conduit;
a plurality of energy storage cells arranged between the first header and the second header; and
a coolant plate assembly arranged between the first header and the second header and abutting the plurality of energy storage cells, the coolant plate assembly including a coolant channel having a first end fluidically connected to the first conduit, a second end fluidically connected to the second conduit, and an intermediate portion defining a flow path, wherein the coolant plate assembly includes a first planar section having a first surface facing the plurality of energy storage cells and a second surface having a first plurality of protrusions extending into the coolant channel.

14. The vehicle of claim 13, further comprising:
another plurality of energy storage cells arranged between the first header and the second header and spaced from the plurality of energy storage cells; and
another coolant plate assembly arranged between the first header and the second header and abutting each of the another plurality of energy storage cells, the another coolant plate assembly including another coolant channel having a first end portion fluidically connected to the first conduit, a second end portion fluidically connected to the second conduit, and an intermediate section defining another flow path, wherein the another coolant plate assembly includes a second planar section having a first surface facing the another plurality of energy storage cells and a second surface having a second plurality of protrusions extending into the another coolant channel.

15. The vehicle of claim 14, wherein the first surface on the coolant plate assembly and the first surface on the another coolant plate assembly are each coated with a thermal interface material.

16. The vehicle of claim 15, wherein the coolant plate assembly includes a first curvilinear section having a first inner surface that faces the coolant channel and a first outer surface and the another coolant plate assembly includes a second curvilinear section having a second inner surface that faces the another coolant channel and a second outer surface.

17. The vehicle of claim 16, wherein the first outer surface of the coolant plate assembly abuts the second outer surface of the another coolant plate assembly at a coolant plate interface and a first air gap is arranged at a first side of the coolant plate interface and a second air gap arranged at a second side of the coolant plate interface.

18. The vehicle of claim 14, wherein the first plurality of protrusions includes varying heights relative to the first surface of the first planar section and the second plurality of protrusions includes varying heights relative to the first surface of the second planar section.

19. The vehicle of claim 14, wherein the first plurality of protrusions is arranged in columns with protrusions in adjacent columns being offset relative to each other in a direction perpendicular to coolant flow through the coolant channel and the second plurality of protrusions are arranged in columns with protrusions in adjacent columns being offset relative to each other in a direction perpendicular to coolant flow through the another coolant channel.

20. A battery pack coolant system comprising:
a coolant plate assembly arranged between a first header and a second header, the coolant plate assembly including a coolant channel having a first end fluidically connected to a first conduit, a second end fluidically connected to a second conduit, and an intermediate portion defining a flow path, wherein the coolant plate assembly includes a first planar section having a first surface for facing at least one first energy storage cell and a second surface at least partially defining the coolant channel and having a first plurality of protrusions extending into the coolant channel; and
another coolant plate assembly arranged between the first header and the second header, the another coolant plate assembly including another coolant channel having a first end portion fluidically connected to the first conduit, a second end portion fluidically connected to the second conduit, and an intermediate section defining another flow path, wherein the another coolant plate includes a second planar section having a first surface for facing at least one second energy storage cell and a second surface having a second plurality of protrusions extending into the another coolant channel.

* * * * *